United States Patent Office 3,658,834
Patented Apr. 25, 1972

3,658,834
PHENYLDITHIOCARBAMIC ACID BENZIMID-
AZOLYL-(2)-METHYL ESTERS
Manfred Schorr, Frankfurt am Main, Walter Durck-
heimer, Hattersheim, Main, and Dieter Duwel, Hof-
heim, Taunus, Germany, assignors to Farbwerke
Hoechst Aktiengesellschaft vormals Meister Lucius &
Bruning, Frankfurt am Main, Germany
No Drawing. Filed Nov. 21, 1969, Ser. No. 878,933
Claims priority, application Germany, Dec. 2, 1968,
P 18 12 142.1
Int. Cl. C07d 49/38
U.S. Cl. 260—309.2                                    8 Claims

ABSTRACT OF THE DISCLOSURE

Dtihiocarbamic acid esters of the formula

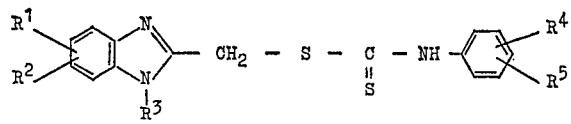

in which $R^1$ is hydrogen, chlorine, bromine, trifluoro-
methyl, nitro or cyano, $R^2$ is hydrogen, chlorine, bromine,
trifluoromethyl or nitro, $R^3$ is hydrogen or alkyl having
1 to 6 carbon atoms, and $R^4$ and $R^5$ each is hydrogen,
chlorine, bromine, iodine, trifluoromethyl or alkyl hav-
ing 1 to 6 carbon atoms, which compounds are active
against helminthic diseases, and a process for preparing
them.

---

The present invention provides new dithiocarbamic acid
esters of the Formula I

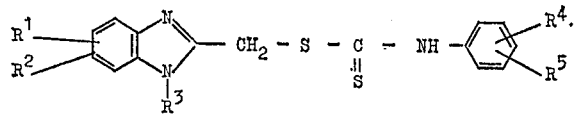

in which $R^1$ is hydrogen, chlorine, bromine, trifluoromethyl, nitro
or cyano;
$R^2$ is hydrogen, chlorine, bromine, trifluoromethyl, or
nitro;
$R^3$ is hydrogen or alkyl having 1 to 6 carbon atoms, and
$R^4$ and $R^5$ each is hydrogen, chlorine, bromine, iodine,
trifluoromethyl or alkyl having 1 to 6 carbon atoms.

The above specified compounds are prepared by react-
ing, in known manner, a salt of a dithiocarbamic acid of
the Formula II

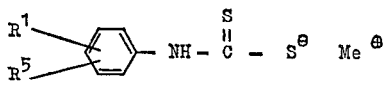

with a halogenated compound of the Formula III

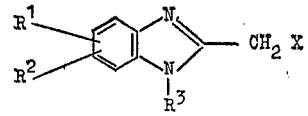

in which X is chlorine, bromine or iodine and Me+ stands
for a monovalent cation.

The starting compounds of the Formula II are prefer-
ably used in the form of water-soluble ammonium or
alkali metal salts. Active halogenated compounds of the
Formula III are, for example, the following:

2-chloromethyl-benzimidazole,
2-bromomethyl-benzimidazole,
2-iodomethyl-benzimidazole,
2-chloromethyl-5-nitrobenzimidazole,
2-chloromethyl-4-nitrobenzimidazole,
2-chloromethyl-5-chlorobenzimidazole,
2-chloromethyl-5-cyanobenzimidazole,
2-chloromethyl-5-trifluoromethyl-benzimidazole,
2-chloromethyl-4-chloro-6-nitro-benzimidazole,
1-methyl-2-chloromethyl-benzimidazole,
1-methyl-2-bromomethyl-5-nitrobenzimidazole and
1-n-butyl-2-chloromethyl-benzimidazole.

Preferable cations Me+ are alkali metal ions, especially
K+ and Na+ as well as NH$_4$+.

The reaction of the invention is preferably carried out
by contacting an aqueous solution of a compound of the
Formula II and a solution of a compound of the Formula
III in a water-miscible solvent, for example, methanol,
ethanol, acetone, tetrahydrofurane, dioxane, acetonitrile
or dimethylformamide, then separating the reaction prod-
uct which precipitates after a short time, and finally purify-
ing it by careful washing or recrystallisation from a suit-
able solvent. According to another embodiment of the in-
vention, the compound of the Formula II is prepared in
situ by reacting a correspondingly substituted aniline with
carbon disulphide and a base and the reaction mixture is
then immediately contacted with a compound of the For-
mula III. The reaction temperature ranges between 0° and
50° C., preferably the reaction is carried out at room tem-
perature.

The novel dithiocarbamic acid esters of the invention
are valuable chemotherapeutical substances suitable for
the treatment of helminthic diseases in mammals. More
particularly, they have a high activity against the liver
fluke (Fasciola heptaica) that infects, above all, sheep
and cattle. The infestation of animals with this parasite
causes heavy economic damage. A specific therapeutic
against the liver fluke is therefore of considerable im-
portance.

In practice, the therapeutic compositions may be ad-
ministered orally or subcutaneously; depending on the
individual case, one or the other of the administration
methods may be more suitable.

The valuable anthelminthic properties of the compounds
were examined using albino rats of a body weight of from
80 to 100 grams. The rats were first infected orally with
5 metacercariae of Fasciola hepatica each. After the
prepatence period it was made sure by examination of
the excrements that the animals were infected with the
parasites. Subsequently, the compounds to be examined
were administered once orally. The success of the thera-
peutical treatment was ascertained by repeated examina-
tion of the excrements and by autopsy of the animals two
weeks after treatment.

The following table comprises a selection of the thera-
peutical results:

TABLE

| Compound | Dos. tol. max.[1] | Dos. cur. min.[2] |
|---|---|---|
| 1. p-Chlorophenyl-dithiocarbamic acid-[5-chloro-benzimidazolyl (2)]-methyl ester. | 780 | 1×50 |
| 2. p-Chlorophenyl-dithiocarbamic acid-[5-nitro-benzimidazolyl (2)]-methyl ester. | 390 | 1×15 |
| 3. p-Chlorophenyl-dithiocarbamic acid-[5-tri-fluoromethyl-bezimidazolyl (2)]-methyl ester. | >500 | 1×50 |
| 4. p-Bromophenyl-dithiocarbamic acid benzimida-zolyl (2)-methyl ester. | 1,250 | 1×40 |
| 5. p-Bromophenyl-dithiocarbamic acid-[5-nitro-benzimidazolyl (2)]-methyl ester. | 780 | 1×25 |
| 6. p-Bromophenyl-dithiocarbamic acid-[5-chloro-benzimidazolyl (2)]-methyl ester. | 780 | 1×50 |
| 7. m-Trifluoromethyl-phenyldithiocarbamic acid benzimidazolyl (2)-methyl ester. | 780 | 1×30 |

[1] Administered orally in mg./kg. of mouse.
[2] Administered orally in mg./kg. of rat.

The compounds of the invention may be used alone
or in combination with other chemotherapeutically active
substances for the production of compositions for the treatment of helminthic infections. The dosage of the active ingredient should comply with the activity of the compound used and with the desired effect.

The following examples illustrate the invention:

EXAMPLE 1

(a) p-Chlorophenyl-dithiocarbamic acid benzimidazolyl(2) methyl ester 127.5 g. of p-chloroaniline were suspended in 115 cc. of concentrated ammonia and 80 cc. of carbon di-sulphide were slowly added dropwise while stirring at 20° C. The temperature rose to 35–40° C. From the clear reaction solution the ammonium salt of p-chlorophenyl-dithiocarbamic acid precipitated rapidly in the form of crystals which were suction-filtered upon cooling and washed with a small amount of ice water.

44 g. (0.2 mol.) of this salt were dissolved in 1 litre of water, small amounts of insoluble contaminatons were separated by filtration and a solution of 33.2 g. (0.2 mol.) of chloromethyl-benzimidazole in 250 cc. of methanol was rapidly added while stirring a semi-solid precipitate separated and was stirred with water. For purification the product was dissolved in the smallest possible amount of acetone. On cooling the filtered solution the end product precipitated in crystals.

Decomposition point: 159–160° C.

In an analogous manner there were obtained:

(b) p-Chlorophenyl-dithiocarbamic acid-[4 - nitrobenzimidazolyl (2)]-methyl ester, decomposition point: 171–173° C. (from dioxane/ether);

(c) p - Chlorophenyl - dithiocarbamic acid - [5 - nitrobenzimidazolyl (2)]-methyl ester which crystallized from ethyl acetate/ether, containing 1 mol. of ether; decomposition point: 108–110° C.;

(d) p-Chlorophenyl-dithiocarbamic acid-[5 - chlorobenzimidazolyl-(2)]-methyl ester, decomposition point: 152–154° C. (from acetone and ethyl acetate);

(e) p-Chlorophenyl-dithiocarbamic acid-[1 - butyl-benzimidazolyl(2)]-methyl ester, decomposition point: 147–149° C. (from acetone);

(f) p-Chlorophenyl-dithiocarbamic acid-[5 - trifluoromethylbenzimidazolyl (2)] - methyl ester, decomposition point: 145–147° C. The crude product was purified by column chromatography on silica gel and then recrystallized from benzene.

EXAMPLE 2

(a) p-bromophenyl-dithiocarbamic acid benzimidazolyl (2)-methyl ester 34.4 g. (0.2 mol.) of p-bromo-aniline were suspended in 23 cc. of concentrated ammonia and, at room temperature, 17 g. of carbon disulphide were slowly added dropwise while stirring. The temperature rose slowly to 35–40° C. From the clear solution the ammonium salt of p-bromo-phenyl-dithiocarbamic acid precipitated in the form of crystals. The crystals were suction-filtered, dissolved in 750 cc. of water, small amounts of contaminations were separated and then a solution of 33.2 g. (0.2 mol.) of chloromethyl-benzimidazole in 500 cc. of acetone was rapidly added while stirring. The reaction product precipitated rapidly, was suction-filtered after about 30 minutes, washed with water and dried over sulphuric acid. For purification the product was recrystallized from methanol. Yield 22 grams; decomposition point: 165–167° C.

In an analogous manner there were obtained:

(b) p-Bromophenyl-dithiocarbamic acid-[5 - chlorobenzimidazolyl (2)]-methyl ester, decomposition point: 148–150° C. (from acetone and ethyl acetate);

(c) p-Bromophenyl-dithiocarbamic acid-[1 - methyl-benzimidazolyl (2)]-methyl ester, decomposition point: 171–173° C.;

(d) p-Bromophenyl-dithiocarbamic acid - [5 - nitrobenzimidazolyl (2)]-methyl ester, decomposition point: 115–116° C.;

The oily crude product crystallized upon rubbing with ether, for purification it was dissolved in ethyl acetate and precipitated with ether; the crystals contained 1 mol. of ether.

(e) p-Bromophenyl-dithiocarbamic acid - [4 - nitrobenzimidazolyl (2)]-methyl ester, decomposition point: 181–183° C.;

The product was purified by dissolving and reprecipitating it from dioxane-ether.

EXAMPLE 3

(a) m-trifluoromethyl-phenyl-dithiocarbamic acid-[5-chlorobenzimidazolyl (2)]-methyl ester 32.2 g. (0.2 mol) of m-trifluoromethyl-aniline were mixed with 23 cc. of concentrated ammonia and at 20° C. 17 g. of carbon disulphide were added dropwise while stirring. The temperature rose to about 35° C. and a clear solution formed. This solution was diluted with 800 cc. of water, the oil that separated was removed and to the clear solution a solution of 40.2 g. of 2-chloromethyl-5 (6)-chlorobenzimidazole in 200 cc. of acetone was quickly added while stirring. An oil precipitated and solidified upon standing and cooling (28 g.). For purification the product was recrystallised twice from ethyl acetate. 22 g. of m-trifluoromethyl-phenyl-dithiocarbamic acid-[5 (6)-chlorobenzimidazolyl (2)] - methyl ester were obtained which contained 1 mol of ethyl acetate in the crystal; decomposition point: 106–108° C.

In an analogous manner there were obtained:

(b) m-Trifluoromethyl - phenyl - dithiocarbamic acid benzimidazolyl (2) - methyl ester, decomposition point: 140° C. (from ethyl acetate);

(c) m-Trifluoromethylphenyl-dithiocarbamic acid - [5-nitrobenzimidazolyl (2)] - methyl ester, decomposition point: 102–104° C., the product that had been redissolved and precipitated from ethyl acetate/ether contained 1 mol of ether in the crystal.

EXAMPLE 4 p-Iodophenyl-dithiocarbamic acid benzimidazolyl (2)-methyl ester 50 g. of p-iodo-aniline were dissolved in 100 cc. of acetonitrile, 30 cc. of concentrated ammonia and 18 cc. of carbon disulphide were added and the mixture was stirred for 3 hours at room temperature. About 60 g. of the ammonium salt of p-iodophenyl-dithiocarbamic acid precipitated and were washed with a small amount of acetonitrile. 40 g. thereof were dissolved in 3 l. of water and a solution of 21 g. of 2-chloromethylbenzimidazole in 300 cc. of acetone was rapidly added while stirring. The precipitate was suction-filtered, washed with water and recrystallized from dioxane/water. 25 g. of the compound having a decomposition point of 166–168° C. were obtained.

EXAMPLE 5 p-Tolyl-dithiocarbamic acid-[5-chlorobenzimidazolyl (2)]-methyl ester 26.7 g. of (0.25 mol) of p-toluidine were mixed with 29 cc. of concentrated ammonia and, at room temperature, 21.5 g. of carbon disulphide were added dropwise while stirring. The temperature of the mixture rose to 35–40° C. and after a short time the ammonium salt of p-tolyl-dithiocarbamic acid precipitated. The salt was dissolved in 800 cc. of water, small impurities were separated by suction-filtration and a solution of 40.2 g. (0.2 mol) of 2-chloromethyl-5 (6) - chlorobenzimidazole in 200 cc. of acetone was added while stirring. An oil precipitated and solidified rapidly. The crystals were washed with ethyl acetate and methanol. 60 g. of p-tolyl-dithiocarbamic acid-

[5 (6)-chlorobenzimidazolyl (2)]-methyl ester were obtained. Decomposition point: 152–154° C.

We claim:
1. A dithiocarbamic acid ester of the formula

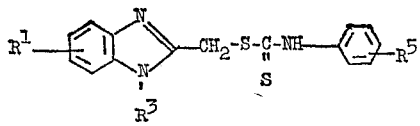

in which
$R^1$ is hydrogen, chlorine, bromine, trifluoromethyl, nitro or cyano;
$R^3$ is hydrogen or alkyl of 1 to 6 carbon atoms; and
$R^5$ is hydrogen, chlorine, bromine, iodine, trifluoromethyl or alkyl of 1 to 6 carbon atoms.

2. p-Chlorophenyl-dithiocarbamic acid [5-chlorobenzimazolyl (2)]-methyl ester.
3. p-Chlorophenyl - dithiocarbamic acid - [5-nitrobenzimazolyl (2)]-methyl ester.
4. p-Chlorophenyl-dithiocarbamic acid - [5 - nitrobenzimazolyl (2)]-methyl ester.
5. p-Bromophenyl-dithiocarbamic acid-benzimidazolyl (2)-methyl ester.
6. p-Bromophenyl - dithiocarbamic acid - [5-nitrobenzimazolyl (2)]-methyl ester.
7. p-Bromophenyl-dithiocarbamic acid - [5-chlorobenzimazolyl (2)]-methyl ester.
8. m-Trifluoromethyl-phenyl-dithiocarbamic acid benzimazolyl (2)]-methyl ester.

References Cited

UNITED STATES PATENTS 3,318,889   5/1967   Bywater et al. ____ 260—309.2
3,345,377   10/1967  Goliasch et al. ____ 260—309.2

FOREIGN PATENTS 1,510,039   12/1967  France _____ 260—309.2

OTHER REFERENCES

Mamedov et al. I Chem. Abst., vol. 61, columns 3092–3 (1964).

Mamedov et al. II Izv. Akad. Nauk SSSR, Ser. Khim. 1964(4), p. 698–704.

NATALIE TROUSOF, Primary Examiner

U.S. Cl. X.R.

424—273